United States Patent
Tsuzaka et al.

(10) Patent No.: US 10,428,233 B2
(45) Date of Patent: Oct. 1, 2019

(54) WATER-BASED INK SET FOR INK-JET PRINTING

(71) Applicant: Brother Kogyo Kabushiki Kaisha, Nagoya-shi, Aichi-ken (JP)

(72) Inventors: Yuka Tsuzaka, Nagoya (JP); Shinpei Ito, Nagoya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 68 days.

(21) Appl. No.: 15/461,977

(22) Filed: Mar. 17, 2017

(65) Prior Publication Data

US 2017/0267890 A1   Sep. 21, 2017

(30) Foreign Application Priority Data

Mar. 18, 2016   (JP) .................. 2016-055413

(51) Int. Cl.
| | |
|---|---|
| *C09D 11/40* | (2014.01) |
| *C09D 11/322* | (2014.01) |
| *C09D 11/324* | (2014.01) |
| *C09D 11/326* | (2014.01) |
| *C09D 11/328* | (2014.01) |

(52) U.S. Cl.
CPC ............ *C09D 11/40* (2013.01); *C09D 11/322* (2013.01); *C09D 11/324* (2013.01); *C09D 11/326* (2013.01); *C09D 11/328* (2013.01)

(58) Field of Classification Search
CPC ..... C09D 11/40; C09D 11/322; C09D 11/324; C09D 11/326; C09D 11/328
USPC .......................................... 524/88
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 7,621,630 B2 | 11/2009 | Ito et al. | |
| 7,819,962 B2 | 10/2010 | Gu | |
| 7,922,805 B2 | 4/2011 | Kowalski et al. | |
| 8,016,404 B2 | 9/2011 | Kato et al. | |
| 8,603,232 B2 | 12/2013 | Tsuzaka et al. | |
| 8,632,629 B2* | 1/2014 | Maeda ................. | C09D 11/324 106/31.47 |
| 8,709,143 B2* | 4/2014 | Ito .......................... | B41J 2/2107 106/31.47 |
| 8,858,695 B2 | 10/2014 | Gu et al. | |
| 2003/0008938 A1 | 1/2003 | Sano et al. | |
| 2005/0036021 A1 | 2/2005 | Ito et al. | |
| 2005/0247235 A1* | 11/2005 | Voeght ................. | C09D 11/101 106/31.27 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0097015 A1* | 4/2008 | Doi ........................ | C09D 11/32 524/115 |
| 2008/0241398 A1 | 10/2008 | Kato et al. | |
| 2008/0254265 A1 | 10/2008 | Ito et al. | |
| 2009/0229489 A1 | 9/2009 | Gu | |
| 2011/0050795 A1* | 3/2011 | Arai ..................... | C09B 67/0013 347/28 |
| 2015/0116392 A1* | 4/2015 | Ohishi .................. | C09D 11/40 347/7 |
| 2016/0075880 A1 | 3/2016 | Gu et al. | |
| 2017/0218217 A1* | 8/2017 | Taga ..................... | C09D 11/322 |
| 2018/0282560 A1* | 10/2018 | Tsuzaka ................ | C09D 11/322 |
| 2018/0282561 A1* | 10/2018 | Taniguchi ............. | C09D 11/322 |
| 2018/0282562 A1* | 10/2018 | Okuda .................. | C09D 11/322 |

FOREIGN PATENT DOCUMENTS

| | | |
|---|---|---|
| JP | H08-003498 A | 1/1996 |
| JP | H10-036731 A | 2/1998 |
| JP | 2000-513396 A | 10/2000 |
| JP | 2002-226738 A | 8/2002 |
| JP | 2005-015765 A | 1/2005 |
| JP | 2005-023325 A | 1/2005 |
| JP | 2006-089559 A | 4/2006 |
| JP | 2008-424400 A | 7/2008 |
| JP | 2008-246821 A | 10/2008 |
| JP | 2009-515007 A | 4/2009 |
| JP | 2011-515535 A | 5/2011 |
| JP | 2013-227412 A | 11/2013 |

OTHER PUBLICATIONS

Computer generated translation of JP 2013-227412, published on Nov. 2013.

* cited by examiner

*Primary Examiner* — Hannah J Pak (74) *Attorney, Agent, or Firm* — Banner & Witcoff, Ltd.

(57) ABSTRACT

A water-based ink set for ink-jet recording includes: a water-based yellow ink containing a yellow pigment, a resin dispersant, and water; a water-based magenta ink containing a magenta pigment, a resin dispersant, and water; a water-based cyan ink containing a cyan pigment, a resin dispersant, and water; and a water-based black ink containing self-dispersible carbon black and water. At least one water-based color ink selected from the group consisting of the water-based yellow ink, the water-based magenta ink, and the water-based cyan ink further contains a dye. The self-dispersible carbon black has an average particle size of 120 to 170 nm.

14 Claims, 2 Drawing Sheets

WATER-BASED INK SET FOR INK-JET PRINTING

CROSS REFERENCE TO RELATED APPLICATION

The present application claims priority from Japanese Patent Application No. 2016-055413 filed on Mar. 18, 2016, the disclosure of which is incorporated herein by reference in its entirety.

BACKGROUND OF THE INVENTION

Field of the Invention

The present invention relates to a water-based ink set for ink-jet recording.

Description of the Related Art

Various documents describe technology for improving image quality when recording is performed by use of a water-based pigment ink set for ink-jet recording including a water-based color pigment ink and a water-based black pigment ink (Japanese Patent Application Laid-open No. 2002-226738; Japanese Patent Application Laid-open No. 2005-15765 corresponding to United States Patent Application Publication No. US 2005/0036021; Japanese Patent Application Laid-open No. 2005-23325 corresponding to United States Patent Application Publication No. US 2003/0008938; and Japanese Patent Application Laid-open No. 2006-89559).

SUMMARY OF THE INVENTION

Regarding the water-based pigment ink set for ink-jet recording, there is known technology in which the water-based color pigment ink and the water-based black pigment ink are used in combination to form tetra black on a recording medium. In recent years, a new approach is desired to improve optical density (an OD value) and a fixing property of tetra black on various recording mediums. In the present teaching, "tetra black" means black formed by four water-based inks including, for example, a water-based yellow ink, a water-based magenta ink, a water-based cyan ink, and a water-based black ink.

An object of the present teaching is to provide a water-based pigment ink set for ink-jet recording that is excellent in optical density (an OD value) and a fixing property of tetra black on a recording medium.

According to an aspect of the present teaching, there is provided a water-based ink set for ink-jet recording, including:

a water-based yellow ink containing a yellow pigment, a resin dispersant, and water;

a water-based magenta ink containing a magenta pigment, a resin dispersant, and water;

a water-based cyan ink containing a cyan pigment, a resin dispersant, and water; and a water-based black ink containing self-dispersible carbon black and water, wherein at least one water-based color ink selected from the group consisting of the water-based yellow ink, the water-based magenta ink, and the water-based cyan ink further contains a dye, and the self-dispersible carbon black has an average particle size of 120 to 170 nm.

DESCRIPTION OF THE EMBODIMENTS

A water-based ink set for ink-jet recording according to the present teaching (hereinafter referred to as "water-based ink set" or "ink set" in some cases) will be explained. The water-based ink set for ink-jet recording according to the present teaching includes a water-based yellow ink, water-based magenta ink, water-based cyan ink, and water-based black ink. At least one water-based color ink selected from the group consisting of the water-based yellow ink, water-based magenta ink, and water-based cyan ink further contains a dye.

<Water-Based Yellow Ink>

The water-based yellow ink will be explained first. The water-based yellow ink contains a yellow pigment, a resin dispersant, and water.

Examples of the yellow pigment include C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; and solid solutions of the above-listed pigments. From among the above, C. I. Pigment yellow 74 is preferably used.

The average particle size (diameter) of the yellow pigment is, for example, in a range of 80 to 200 nm, in a range of 100 to 170 nm, or in a range of 110 to 140 nm. The average particle size may be measured as follows. For example, the pigment is diluted to have a pigment solid content of 0.02% by weight, and scattered light intensity is calculated as the reference of particle size by using a dynamic scattering type particle size distribution measuring apparatus "LB-550" produced by HORIBA, Ltd. In the following, the average particle size may be measured in the same manner.

The blending amount of the yellow pigment (yellow pigment solid content amount) in the entire amount of the water-based yellow ink is not particularly limited, and may be appropriately determined based on, for example, a desired chromaticness. The yellow pigment solid content amount is, for example, in a range of 0.1% by weight to 20% by weight, in a range of 1% by weight to 10% by weight, or in a range of 2% by weight to 6% by weight.

As the resin dispersant, for example, a general-purpose polymeric dispersant may be used, and the general-purpose polymeric dispersant may be a commercially available product. Examples of the commercially available product include "JOHNCRYL (trade name) 611", "JOHNCRYL (trade name) 60", "JOHNCRYL (trade name) 586", "JOHNCRYL (trade name) 687", "JOHNCRYL (trade name) 63", and "JOHNCRYL (trade name) HPD296" produced by BASF Corporation; "Disperbyk 190" and "Disperbyk 191" produced by BYK additives & Instruments; and "SOLSPERSE 20000" and "SOLSPERSE 27000" produced by Zeneca.

The blending amount of the resin dispersant in the entire amount of the water-based yellow ink is, for example, in a range of 0.01% by weight to 10% by weight, in a range of 0.02% by weight to 5% by weight, or in a range of 0.5% by weight to 3% by weight.

The water may be ion-exchanged water or pure water (purified water). The blending amount of the water in the entire amount of the water-based yellow ink may be, for example, a balance of the other components.

When the water-based yellow ink contains the dye, the dye is exemplified, for example, by C. I. Direct Yellows 12, 24, 26, 86, 98, 132, 142, and 173: and C. I. Acid Yellows 11, 17, 23, 25, 29, 42, 61, and 71. The blending amount of the dye in the entire amount of the water-based yellow ink is, for example, in a range of 0.1% by weight to 10% by weight, in a range of 0.2% by weight to 5% by weight, or in a range of 0.5% by weight to 2% by weight. The water-based color ink containing the dye has a great color expression property, resulting in improvement of the optical density (OD value) of tetra black on the recording medium. Meanwhile, if the blending amount of the dye is too much, coagulation (aggregation) may occur due to contact between the water-based color ink and the water-based black ink (contact coagulation (aggregation)). Making the blending amount of the dye within the above ranges improves the optical density (OD value) and prevents the contact coagulation. When the water-based magenta ink or the water-based cyan ink contains the dye, the water-based yellow ink may not contain the dye.

The water-based yellow ink may further contain a water-soluble organic solvent and an acetylenic glycol-based surfactant. The water-based yellow ink may further contain a conventionally known additive, as necessary. The additive is exemplified, for example, by pH-adjusting agents, viscosity-adjusting agents, surface tension-adjusting agents, and fungicides. The viscosity-adjusting agents are exemplified, for example, by polyvinyl alcohol, cellulose, and water-soluble resin.

The water-based yellow ink may be prepared, for example, by mixing the yellow pigment, the resin dispersant, water, and optionally other additive component(s) as necessary uniformly or homogeneously through any conventionally known method and then removing undissolved matters by a filter or the like.

<Water-Based Magenta Ink>

Subsequently, the water-based magenta ink will be explained. The composition, preparation method, and the like of the water-based magenta ink are similar to those of the water-based yellow ink, except for the magenta pigment and the dye that may be used in the water-based magenta ink. Thus, only the magenta pigment and the dye that may be used in the water-based magenta ink will be explained.

Examples of the magenta pigment include C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; and solid solutions of the above-listed pigments. From among the above, C. I. Pigment Red 122 is preferably used. Regarding the water-based magenta ink containing C.I. Pigment Red 122, the fixing property of the magenta ink on the recording medium improves singly or independently, which in turn improves the fixing property of tetra black on the recording medium. Examples of the solid solutions include a solid solution containing two pigments of C.I. Pigment Red 122 and C.I. Pigment Violet 19 and a solid solution containing two pigments of C.I. Pigment Red 202 and C.I. Pigment Violet 19.

The average particle size of the magenta pigment is, for example, in a range of 80 to 200 nm, in a range of 100 to 170 nm, or in a range of 110 to 150 nm.

When the water-based magenta ink contains the dye, the dye is exemplified, for example, by a dye represented by the formula (1); C. I. Direct Reds 1, 4, 17, 28, 83, and 227; C. I. Acid Reds 1, 6, 32, 37, 51, 52, 80, 85, 87, 92, 94, 115, 180, 256, 289, 315, and 317; and C.I. Basic Reds 1, 2, 9, 12, 13, 14, and 37. From the above, the dye represented by the formula (1), C.I. Acid Red 1, and C.I. Acid Red 289 are preferably used. The blending amount of the dye in the entire amount of the water-based magenta ink is, for example, in a range of 0.1% by weight to 10% by weight, in a range of 0.2% by weight to 5% by weight, or in a range of 0.5% by weight to 2% by weight. Making the blending amount of the dye within the above ranges improves the optical density (OD value) and prevents the contact coagulation (aggregation). When the water-based yellow ink or the water-based cyan ink contains the dye, the water-based magenta ink may not contain the dye.

(1)

In the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ may be identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ may be identical to or different from each other;

when any one of $R^1$ to $R^6$ has an acid group, a part or all of the acid group(s) may be in a salt form, namely, when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms may be identical to or different from each other.

In the formula (1), the substituted or non-substituted alkyl group in $R^1$, $R^2$ and $R^3$ is preferably an alkyl group having 1 to 9 carbon atom(s) in total. The substituted or non-substituted alkyl group is exemplified, for example, by methyl group, ethyl group, n-propyl group, isopropyl group, n-butyl group, trifluoromethyl group, and dimethylaminomethyl group. The substituent of the substituted alkyl group is exemplified, for example, by hydroxyl group; alkoxy group such as methoxy group and ethoxy group; cyano group;

halogen atom such as fluorine atom, chlorine atom, bromine atom, and iodine atom; and ionic hydrophilic group such as carboxylate and sulfonate.

In the formula (1), the substituted or non-substituted alkoxy group in $R^1$, $R^2$ and $R^3$ is preferably an alkoxy group having 1 to 9 carbon atom(s) in total. The substituted or non-substituted alkoxy group is exemplified, for example, by methoxy group, isopropoxy group, and n-butoxy group.

In the formula (1), the halogen atom in $R^1$, $R^2$ and $R^3$ is exemplified, for example, by fluorine atom, chlorine atom, bromine atom, and iodine atom.

In the formula (1), the substituted or non-substituted carbamoyl group in $R^1$, $R^2$ and $R^3$ is exemplified, for example, by carbamoyl group, N—N-dimethylcarbamoyl group, and phenylcarbamoyl group.

In the formula (1), the substituted or non-substituted sulfamoyl group in $R^1$, $R^2$ and $R^3$ is exemplified, for example, by sulfamoyl group, N-methylsulfamoyl group, N-ethylsulfamoyl group, N-ethyl-N-phenylsulfamoyl group, N,N-dimethylsulfamoyl group, and p-carboxyphenylsulfamoyl group.

In the formula (1), the substituted or non-substituted amino group in $R^1$, $R^2$ and $R^3$ is exemplified, for example, by N-methylamino group, carbamoylamino group, N,N-diethylamino group, and acetylamino group.

In the formula (1), the sulfonic acid ester group in $R^1$, $R^2$ and $R^3$ is exemplified, for example, by phenoxysulfonyl group.

In the formula (1), the substituted or non-substituted alkylsulfonyl group in $R^1$, $R^2$ and $R^3$ is preferably an alkylsulfonyl group having 1 to 9 carbon atom(s) in total. The substituted or non-substituted alkylsulfonyl group is exemplified, for example, by hydroxysulfonyl group.

In the formula (1), the substituted or non-substituted arylsulfonyl group in $R^1$, $R^2$ and $R^3$ is preferably an arylsulfonyl group having 6 to 15 carbon atoms in total. The substituted or non-substituted arylsulfonyl group is exemplified, for example, by benzylsulfonyl group.

In the formula (1), the carboxylic acid ester group in $R^1$, $R^2$ and $R^3$ is exemplified, for example, by methoxycarbonyl group.

In the formula (1), the substituted or non-substituted alkyl group in $R^4$, $R^5$ and $R^6$ is preferably an alkyl group having 1 to 18 carbon atom(s) in total. The substituted or non-substituted alkyl group is exemplified, for example, by ethyl group, n-butyl group, n-octyl group, ethylhexyl group, hydroxyethyl group, carboxypropryl group, carboxycyclohexylmethyl group, 1-carboxy-2-mercapto-ethyl group, 1-carboxy-2-carbamoyl-ethyl group, 1-isopropyl-1-carboxymethyl group, and 1,2-dicarboxypropyl group. The substituent of the substituted alkyl group is exemplified, for example, by hydroxyl group; alkoxy group such as methoxy group and ethoxy group; cyano group; halogen atom such as fluorine atom, chlorine atom, bromine atom, and iodine atom; and ionic hydrophilic group such as carboxylate and sulfonate.

In the formula (1), the substituted or non-substituted alkenyl group in $R^4$, $R^5$ and $R^6$ is preferably an alkenyl group having 2 to 18 carbon atoms in total. The substituted or non-substituted alkenyl group is exemplified, for example, by 2-methyl-1-propenyl group, vinyl group, and allyl group.

In the formula (1), the substituted or non-substituted aryl group in $R^4$, $R^5$ and $R^6$ is exemplified, for example, by 3,4-dicarboxyphenyl group, 4-butylphenyl group, and 4-carboxyphenyl group. The substituent of the substituted aryl group is exemplified, for example, by those same as the above-described exemplified substituents for the substituted alkyl group.

In the formula (1), the substituted or non-substituted aralkyl group in $R^4$, $R^5$ and $R^6$ is exemplified, for example, by benzyl group, 1-carboxy-2-phenyl-ethyl group, 1-carboxy-2-hydroxyphenylethyl group, and 4-carboxybenzyl group.

In the formula (1), the substituted or non-substituted alicyclic group in $R^4$, $R^5$ and $R^6$ is exemplified, for example, by cyclohexyl group and 4-carboxycyclohexyl group.

In the formula (1), the substituted or non-substituted heterocyclic group in $R^4$, $R^5$ and $R^6$ is exemplified, for example, by pyridyl group, thiadiazolyl group, benzothiazolyl group, and 2,2,6,6-tetramethylpiperidinyl group. The substituent of the substituted heterocyclic group is exemplified, for example, by those same as the above-described exemplified substituents for the substituted alkyl group.

In the formula (1), at least one of $R^4$, $R^5$ and $R^6$ may be an alkyl group, alkenyl group, aryl group, alicyclic group, aralkyl group or heterocyclic group which is substituted by one to four pieces of carboxy group(s) or sulfamoyl group(s).

In the formula (1), each of $R^4$ and $R^5$ may be a hydrogen atom or a tri-substituted phenyl group, and $R^4$ and $R^5$ may be identical to or different from each other. Here, each of three substituents of the tri-substituted phenyl group is a hydrogen atom, a halogen atom, a hydroxyl group, a substituted or non-substituted alkyl group having 1 to 9 carbon atom(s) in total, a substituted or non-substituted alkoxy group having 1 to 9 carbon atom(s) in total, a substituted or non-substituted carbamoyl group, a substituted or non-substituted sulfamoyl group, a substituted or non-substituted amino group, a nitro group, a sulfonic acid ester group, or a carboxylic acid ester group. The aforementioned three substituents may be identical to or different from each other.

A preferable aspect of the dye represented by the formula (1) is exemplified, for example, by an aspect wherein in the formula (1), at least one of $R^4$, $R^5$ and $R^6$ is an alkyl group, an alkenyl group, an aryl group, an aralkyl group, or a cyclohexyl group substituted by one to four pieces of carboxy group(s) or sulfamoyl group(s).

Regarding the dye represented by the formula (1), the number of sulfonic group, carboxy group, or the salt thereof contained in its structure is preferably six or less in total, more preferably five or less in total, and much more preferably four or less in total.

Another preferable aspect of the dye represented by the formula (1) is exemplified, for example, by an aspect wherein in the formula (1):

n is 0;

$R^1$ is a carboxy group, a carbamoyl group, a trifluoromethyl group, or a sulfamoyl group;

$R^2$, $R^3$ and $R^5$ each are a hydrogen atom;

$R^4$ is a phenyl group optionally substituted by a carboxy group or a sulfamoyl group, or a carboxy alkyl group;

$R^6$ is a hydrogen atom or an alkyl group;

when any one of $R^1$ to $R^6$ has an acid group, a part or all of the acid group(s) may be in a salt form;

each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$ and $C_2H_4NH_2$.

The dye represented by the formula (1) can be manufactured in accordance with known methods. For example, it can be manufactured by the method disclosed in U.S. Pat. No. 8,603,232.

Preferable specific examples of the dye represented by the formula (1) include compounds represented by the following formulae (1-1) to (1-5).

(1-1)

The compound represented by the formula (1-1) is an aspect wherein in the formula (1),
n is 0;
$R^1$ is a carboxy group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is $NH_4$.

(1-2)

The compound represented by the formula (1-2) is an aspect wherein in the formula (1),
n is 0;
$R^1$ is a carbamoyl group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is Na.

(1-3)

The compound represented by the formula (1-3) is an aspect wherein in the formula (1),
n is 0;
$R^1$ is a sulfamoyl group at the 3-position of a phenyl group bonded to an azo group;
$R^2$, $R^3$ and $R^5$ each are a hydrogen atom;
$R^4$ is a 2-sulfamoylphenyl group;
$R^6$ is an isopropyl group; and
M is $NH_3C_2H_5$.

(1-4)

The compound represented by the formula (1-4) is an aspect wherein in the formula (1),
n is 0;
$R^1$ is a trifluoromethyl group at the 2-position of a phenyl group bonded to an azo group;
$R^2$, $R^3$ and $R^5$ each are a hydrogen atom;
$R^4$ is a 1-carboxy-2-methylbutyl group;
$R^6$ is a methyl group; and
M is $NH_3CH_3$.

(1-5)

The compound represented by the formula (1-5) is an aspect wherein in the formula (1),
n is 0;
$R^1$ is a carboxy group at the 2-position of a phenyl group bonded to an azo group;
$R^2$, $R^3$ and $R^5$ each are a hydrogen atom;
$R^4$ is a phenyl group;
$R^5$ is a hydrogen atom; and
M is $NH_4$.

In the water-based ink set of the present teaching, the water-based magenta ink preferably contains the dye. The hue angle of the dye in the water-based magenta ink is, for example, in a range of 330° to 360°, in a range of 0° to 10°, or in a range of 340° to 360°. When the hue angle of the dye is within the above ranges, the color expression property of the water-based magenta ink improves singly or independently, which in turn improves the optical density (OD value) of tetra black on the recording medium and image quality. Examples of the dye making the hue angle within the above ranges include the dye represented by the formula (1), C.I. Acid Red 1, and C.I. Acid Red 289.

<Water-Based Cyan Ink>

Subsequently, the water-based cyan ink will be explained. The composition, preparation method, and the like of the water-based cyan ink are similar to those of the water-based yellow ink, except for the cyan pigment and the dye that may be used in the water-based cyan ink. Thus, only the cyan pigment and the dye that may be used in the water-based cyan ink will be explained.

Examples of the cyan pigment include C. I. Pigment Blues 1, 2, 3, 15, 15:1, 15:2, 15:3, 15:4, 16, 22, and 60; and solid solutions of the above-listed pigments. From among the above, C. I. Pigment Blue 15:3 is preferably used.

The average particle size (diameter) of the cyan pigment is, for example, in a range of 80 to 200 nm, in a range of 100 to 170 nm, or in a range of 100 to 130 nm.

The blending amount of the cyan pigment (cyan pigment solid content amount) in the entire amount of the water-based cyan ink is not particularly limited, and may be appropriately determined based on, for example, a desired chromaticness. The cyan pigment solid content amount is, for example, in a range of 0.1% by weight to 20% by weight, in a range of 1% by weight to 10% by weight, or in a range of 2% by weight to 6% by weight.

When the water-based cyan ink contains the dye, the dye is exemplified, for example, by C. I. Direct Blues 6, 22, 25, 71, 86, 90, 106, and 199; C. I. Acid Blues 9, 22, 40, 59, 90, 93, 102, 104, 117, 120, 167, 229, and 234; and C. I. Basic Blues 1, 3, 5, 7, 9, 24, 25, 26, 28, and 29. The blending amount of the dye in the entire amount of the water-based cyan ink is, for example, in a range of 0.1% by weight to 10% by weight, in a range of 0.2% by weight to 5% by weight, or in a range of 0.5% by weight to 2% by weight. Making the blending amount of the dye within the above ranges improves the optical density (OD value) and prevents the contact coagulation (aggregation). When the water-based yellow ink or the water-based magenta ink contains the dye, the water-based cyan ink may not contain the dye.

<Water-Based Black Ink>

Subsequently, the water-based black ink will be explained. The water-based black ink contains self-dispersible carbon black and water.

The self-dispersible carbon black is dispersible in water without using any dispersant, for example, owing to the fact that at least one of a hydrophilic group and the salt thereof including, for example, carbonyl group, hydroxyl group, carboxylic acid group (carboxy group), sulfonic acid group (sulfonate group), and phosphoric acid group (phosphate group) is introduced into particles of the carbon black by the chemical bond directly or with any group intervening therebetween. It is possible to use self-dispersible carbon black subjected to the surface treatment by any one of methods described, for example, in Japanese Patent Application Laid-open No. HEIS-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380 A1), Published Japanese Translation of PCT International Publication for Patent Application No. 2009-515007 (corresponding to United States Patent Application Publication Nos. US 2007/0100023 A1, No. US 2007/0100024 A1, and US 2016/0075880 A1), and Published Japanese Translation of PCT International Publication for Patent Application No. 2011-515535 (corresponding to United States Patent Application Publication No. US 2009/0229489 A1). Examples of carbon black suitable for the above-described treatment include "MA8", "MA100", and "#2650" produced by Mitsubishi Chemical Corporation. The self-dispersible carbon black may be a commercially available product. The commercially available product is exemplified, for example, by "CAB-O-JET (trade name) 200", "CAB-O-JET (trade name) 300" and "CAB-O-JET (trade name) 400" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The average particle size of the self-dispersible carbon black is in a range of 120 to 170 nm. The average particle size of the self-dispersible carbon black may be in a range of 135 to 170 nm or in a range of 140 to 170 nm.

The blending amount of the self-dispersible carbon black (black pigment solid content amount) in the entire amount of the water-based black ink is not particularly limited, and may be appropriately determined based on, for example, a desired optical density (OD value). The black pigment solid content amount is, for example, in a range of 0.1% by weight to 20% by weight, in a range of 1% by weight to 15% by weight, in a range of 2% by weight to 10% by weight, or in a range of 6% by weight to 10% by weight. Making the black pigment solid content amount within the above ranges improves the optical density (OD value) and fixing property of tetra black on the recording medium.

In addition to the self-dispersible carbon black, the water-based black ink may further contain or may not any other colorant such as dye.

The water-based black ink may use water in the same way as the water-based yellow ink. Further, as with the water-based yellow ink, the water-based black ink may contain a water-soluble organic solvent, an acetylenic glycol-based surfactant, and an additive.

The water-based black ink may be prepared, for example by mixing the self-dispersible carbon black, water, and optionally other additive component(s) as necessary uniformly or homogeneously through any conventionally known method and then removing undissolved matters by a filter or the like.

Each of the water-based yellow ink, the water-based magenta ink, the water-based cyan ink, and the water-based black ink may further contain a water-soluble organic solvent. The water-soluble organic solvent is exemplified, for example, by a humectant that prevents the water-based ink from drying at an end of a nozzle in an ink-jet head and a penetrant that adjusts the drying velocity on the recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the water-based yellow ink is, for example, in a range of 0% by weight to 95% by weight, in a range of 5% by weight to 80% by weight, or in a range of 5% by weight to 50% by weight. The same is true on the water-based magenta ink, the water-based cyan ink, and the water-based black ink.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Among the above, triethylene glycol-n-butyl ether is preferably used. Only one kind of the penetrant as described above may be used singly, or two or more kinds of the penetrants may be used in combination.

The blending amount of the penetrant in the entire amount of the water-based yellow ink is, for example, in a range of 0% by weight to 20% by weight, in a range of 0% by weight to 15% by weight, or in a range of 1% by weight to 6% by weight. The same is true on the water-based magenta ink, the water-based cyan ink, and the water-based black ink.

Each of the water-based yellow ink, the water-based magenta ink, the water-based cyan ink, and the water-based black ink may further contain an acetylenic glycol-based surfactant. The acetylenic glycol-based surfactant is exemplified, for example, by a compound represented by the formula (3).

(3)

In the formula (3), p and q may be identical to or different from each another. For example, p and q are integers satisfying p+q=1 to 15, 3 to 11, or 4 to 10. In the formula (3), $R^{21}$, $R^{22}$, $R^{23}$, and $R^{24}$ may be identical to or different from each other, and each of $R^{21}$, $R^{22}$, $R^{23}$, and $R^{24}$ is a straight or branched chain alkyl group having 1 to 5 carbon atoms.

The acetylenic glycol-based surfactant may be a commercially available product. The commercially available product is exemplified, for example, by "OLFIN (trade name) E1004", "OLFIN (trade name) E1008", and "OLFIN (trade name) E1010" produced by Nissin Chemical Industry Co., Ltd.

The blending amount of the acetylenic glycol-based surfactant in the entire amount of the water-based yellow ink is, for example, in a range of 0.1% by weight to 5% by weight, in a range of 0.1% by weight to 2% by weight, or in a range of 0.1% by weight to 1% by weight. The same is true on the water-based magenta ink, the water-based cyan ink, and the water-based black ink.

As described above, in the water-based ink set of the present teaching, the water-based black ink contains the self-dispersible carbon black, and each of the water-based color inks contains each of the color pigments and the resin dispersant. When tetra black is formed on the recording medium by use of the water-based ink set of the present teaching, it is assumed that, each of the color pigments and the self-dispersible carbon black are coated, on the recording medium, with the resin of the resin dispersant in each of the water-based color inks, thus improving the fixing property of tetra black on the recording medium. Further, it is assumed that the fixation property of a color recording portion recorded with each of the water-based color inks also improves, because each of the water-based color inks contains each of the color pigments and the resin dispersant. The above mechanisms, however, are just assumptions and the present teaching is not limited thereto.

As described above, in the water-based ink set of the present teaching, at least one of the water-based color inks selected from the group consisting of the water-based yellow ink, water-based magenta ink, and water-based cyan ink contains the dye. It is assumed that, in the water-based ink set of the present teaching, the color expression property of the water-based color ink containing the dye improves singly or independently, which in turn improves the optical density (OD value) of tetra black. Further, image quality of an image to be formed by the water-based color ink containing the dye and other remaining water-based ink(s) may improve, and thus color expression ranges of colors other than tetra black may also improve. The above mechanisms, however, are just assumptions and the present teaching is not limited thereto.

In the water-based ink set of the present teaching, the average particle size of the self-dispersible carbon black is preferably greater than those of the yellow pigment, the magenta pigment, and the cyan pigment. In the present teaching, since the average particle size of the self-dispersible carbon black is relatively large (120 to 170 nm), the optical density (OD value) improves. The self-dispersible carbon black having the relatively large average particle size, however, is not likely to permeate in the recording medium, which could cause uneven density and/or a white streak. In the water-based ink set of the present teaching, the uneven density and white streak may be prevented by forming a black recording portion by tetra black with the water-based black ink and the water-based color inks each containing a color pigment of which average particle size is smaller than that of the self-dispersible carbon black. Accordingly, the optical density (OD value) of tetra black on the recording medium can improve further. Making the average particle size of each color pigment of each water-based color ink small can improve the color expression property of the water-based color ink singly or independently.

In the water-based ink set of the present teaching, the water-based color ink containing the color pigment of which average particle size is greatest among the yellow pigment, the magenta pigment, and the cyan pigment preferably contains the dye. Regarding the water-based color ink containing the color pigment of which average particle size is greatest among the yellow pigment, the magenta pigment, and the cyan pigment, the color pigment is not likely to permeate in the recording medium, which could cause a white streak in a color recording portion recorded by the water-based color ink. In the water-based ink set of the present teaching, however, the water-based color ink containing the dye may prevent the white streak. This may further improve the optical density (OD value) of tetra black on the recording medium. The mechanisms, however, are just assumptions, and the present teaching is not limited to those assumptions.

In the water-based ink set of the present teaching, image quality may improve both of when all the water-based yellow ink, water-based magenta ink, and water-based cyan ink contain the dye and when any one of the above water-based color inks contains the dye. The water-based color ink containing the dye, however, could reduce water resistance. In order to achieve high water resistance and high image quality, it is preferable that any one of the water-based color inks contain the dye. Namely, it is preferable that only one water-based color ink selected from the group consisting of the water-based yellow ink, water-based magenta ink, and water-based cyan ink contain the dye and remaining two water-based color inks contain no dye.

Although the average particle size of each of the pigments is not particularly limited, for example, the self-dispersible carbon black may have a largest average particle size, the magenta pigment may have a second largest average particle size, the yellow pigment may have a third largest average particle size, and the cyan pigment may have a smallest average particle size. That is, self-dispersible carbon black>magenta pigment>yellow pigment>cyan pigment may be satisfied. In the water-based ink set of the present teaching, the average particle size of the magenta pigment is preferably in a range of 110 to 150 nm, the average particle size of the yellow pigment is preferably in a range of 110 to 140 nm, and the average particle size of the cyan pigment is preferably in a range of 100 to 130 nm. Making the average particle size of the self-dispersible carbon black larger than those of three color pigments improves the optical density (OD value) of tetra black on the recording medium and prevents the uneven density and/or white streak. Regarding the cyan pigment, making the particle size thereof small improves dispersion stability in the water-based ink. In view of preventing the white streak in a color recording portion, the water-based magenta ink containing the magenta pigment, of which average particle size is largest among the three color pigments, preferably contains the dye. In order to achieve both high water resistance and high image quality, it is preferable that the water-based magenta ink contain the dye and the water-based yellow ink and water-based cyan ink contain no dye.

In the water-based ink set of the present teaching, the weight ratio between the blending amount (P) of the self-dispersible carbon black in the entire amount of the water-based black ink and the blending amount (D) of the dye in the entire amount of the water-based color ink containing the dye is, for example, D:P=1:3 to 100 or 1:3 to 50. Namely, the weight ratio (P/D) of the blending amount (P) of the self-dispersible carbon black in the entire amount of the water-based black ink to the blending amount (D) of the dye in the entire amount of the water-based color ink containing the dye is 3 to 100 or 3 to 50. The self-dispersible carbon black is negatively charged by a modifying group on a surface thereof, dispersing in the water-based black ink. Meanwhile, the dye is ionized and dissolved in the water-based color ink. Thus, the water-based color ink containing the dye contains a plus ion (positive ion). If the water-based black ink makes contact with the water-based color ink, the plus ion in the water-based color ink may destabilize dispersion of the negatively charged self-dispersible carbon black, thus causing coagulation (contact coagulation). For example, if the contact coagulation occurs on a nozzle-formed surface of an ink-jet head, ink jetting may be destabilized. Making the weight ratio (P/D) within the above ranges prevents the contact coagulation and improves the optical density (OD value) of tetra black on the recording medium.

Although various pigments as described above may be used as the respective color pigments in the water-based ink set of the present teaching, the yellow pigment is preferably C.I. Pigment Yellow 74, the magenta pigment is preferably C.I. Pigment Red 122, and the cyan pigment is preferably C.I. Pigment Blue 15:3. The water-based ink set containing those pigments can improve the optical density (OD value) of tetra black on the recording medium.

In the water-based ink set of the present teaching, all of the four water-based inks including the water-based yellow ink, water-based magenta ink, water-based cyan ink, and water-based black ink preferably contain triethylene glycol-n-butyl ether and/or an acetylenic glycol-based surfactant. By allowing all the four water-based inks of the water-based ink set to contain the same penetrant and/or the same surfactant, affinity between the four inks improves, resulting in improvement of the optical density (OD value) of tetra black on the recording medium.

When the respective water-based inks contain triethylene glycol-n-butyl ether in similar amounts, the optical density (OD value) of tetra black on the recording medium can improve further. For example, the water-based ink set of the present teaching preferably satisfies the following conditions (A1) to (A3).

$0.5<(YP/BkP)<2.0$            Condition (A1):

$0.5<(MP/BkP)<2.0$            Condition (A2):

$0.5<(CP/BkP)<2.0$            Condition (A3):

In the conditions (A1) to (A3), YP represents the blending amount (% by weight) of triethylene glycol-n-butyl ether in the water-based yellow ink, MP represents the blending amount (% by weight) of triethylene glycol-n-butyl ether in the water-based magenta ink, CP represents the blending amount (% by weight) of triethylene glycol-n-butyl ether in the water-based cyan ink, and BkP represents the blending amount (% by weight) of triethylene glycol-n-butyl ether in the water-based black ink.

When the respective water-based inks contain the acetylenic glycol-based surfactant in similar amounts, the optical density (OD value) of tetra black on the recording medium can improve further. For example, the water-based ink set of the present teaching preferably satisfies the following conditions (B1) to (B3).

$0.3<(YS/BkS)<3.0$            Condition (B1):

$0.3<(MS/BkS)<3.0$            Condition (B2):

$0.3<(CS/BkS)<3.0$            Condition (B3):

In the conditions (B1) to (B3), YS represents the blending amount (% by weight) of the acetylenic glycol-based surfactant in the water-based yellow ink, MS represents the blending amount (% by weight) of the acetylenic glycol-based surfactant in the water-based magenta ink, CS represents the blending amount (% by weight) of the acetylenic glycol-based surfactant in the water-based cyan ink, and BkS represents the blending amount (% by weight) of the acetylenic glycol-based surfactant in the water-based black ink.

As described above, the optical density (OD value) and fixing property of tetra black on the recording medium can be improved by using the water-based ink set of the present teaching which includes the water-based black ink containing the self-dispersible carbon black of which average particle size is 120 to 170 nm and water-based color inks including color pigments and the resin dispersant, wherein any of the water-based color inks contains the dye.

Subsequently, an ink-jet recording apparatus of the present teaching will be described.

The ink-jet recording apparatus of the present teaching is an ink-jet recording apparatus characterized by including: ink accommodating sections configured to accommodate inks therein; and an ink jetting mechanism configured to jet the inks accommodated in the ink accommodating sections; wherein the inks accommodated in the ink accommodating sections are the water-based yellow ink, the water-based magenta ink, the water-based cyan ink, and the water-based black ink configuring the water-based ink set for ink-jet recording of the present teaching.

Figure 1:
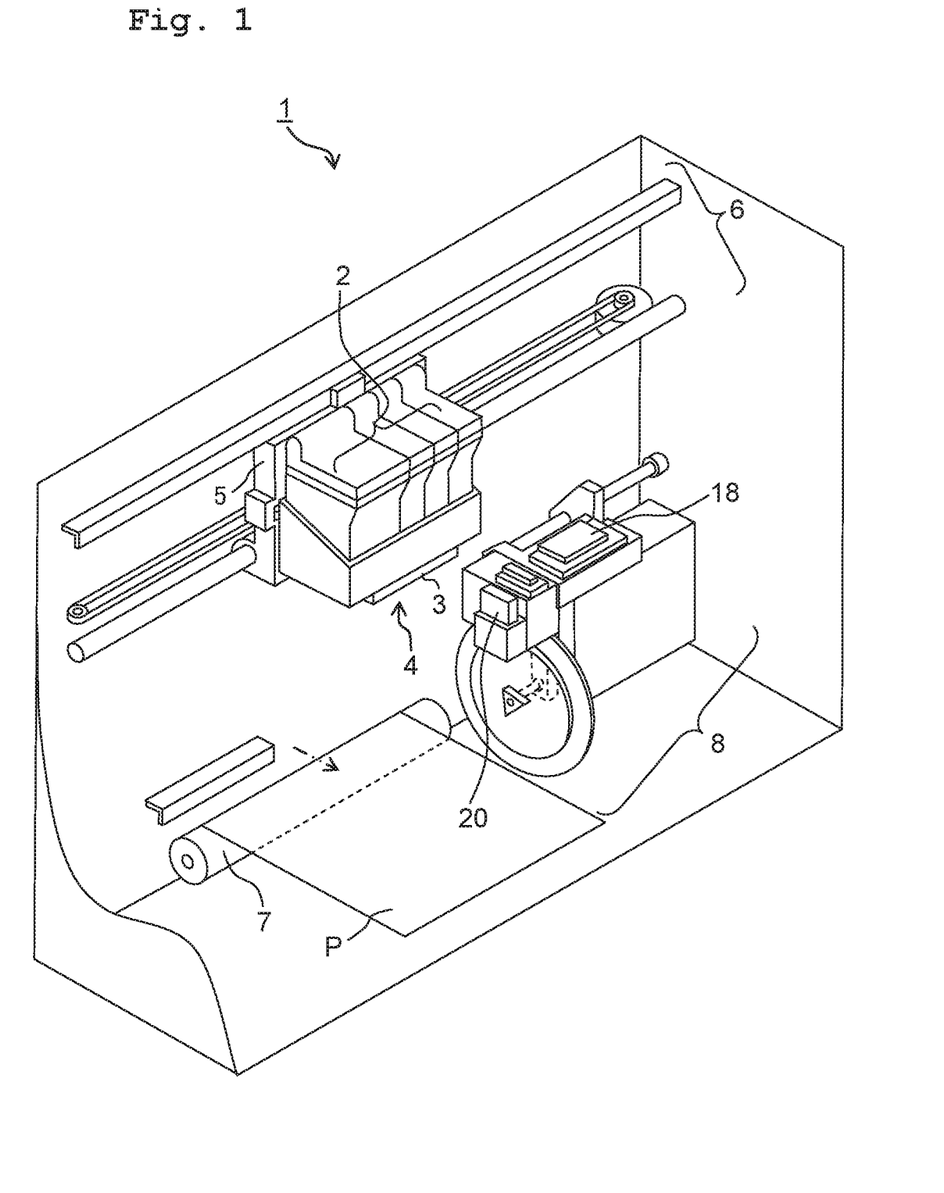
FIG. 1 is a schematic perspective view of an exemplary configuration of an ink-jet recording apparatus of the present teaching.

FIG. 1 depicts an exemplary configuration of the ink-jet recording apparatus of the present teaching. As depicted in FIG. 1, an ink-jet recording apparatus 1 of the present teaching includes four ink cartridges 2, an ink jetting mechanism (ink-jet head) 3, a head unit 4, a carriage 5, a driving unit 6, a platen roller 7 and a purge device 8 as main constitutive components or parts.

Each of the four ink cartridges 2 contains the corresponding one of four water-based inks of yellow, magenta, cyan, and black. The four water-based inks correspond to the water-based yellow ink, the water-based magenta ink, the water-based cyan ink, and the water-based black ink, respectively. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge can be used.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles is preferably provided with an inlet port via which the ink is poured from the outside to the inside of the ink bottle.

Ink-jet recording using the ink-jet recording apparatus 1 is performed, for example, in the following manner. Namely, at first, the recording sheet P is supplied or fed from a paper feeding cassette or sheet feeding cassette (not depicted in the drawing) arranged at a side of or at a position below the ink-jet recording apparatus 1. The recording sheet P is introduced or guided between the ink-jet head 3 and the platen roller 7. Then, a predefined recording is performed on the fed or introduced recording sheet P with the water-based ink(s) jetted from the ink-jet head 3. On that occasion, for example, tetra black may be formed by jetting the water-based black ink, water-based magenta ink, water-based cyan ink, and water-based yellow ink from the nozzles of the ink-jet head 3 on the recording sheet P. The jetting order of the water-based black ink, water-based magenta ink, water-based cyan ink, and water-based yellow ink is not particularly limited. The recording sheet P after recording is discharged from the ink-jet recording apparatus 1. According to the present teaching, it is possible to obtain a recorded matter excellent in the optical density (OD value) and fixation property of the tetra black on the recording medium. In FIG. 1, illustration of the feed mechanism and discharge mechanism for the recording paper P is omitted.

In the apparatus depicted in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

The ink-jet recording method of the present teaching is an ink-jet recording method characterized by including: performing recording on a recording medium by jetting, to the recording medium, each water-based ink configuring a water-based ink set by an ink-jet system; and using the water-based ink set for ink-jet recording of the present teaching, as the water-based ink set. The recording includes printing a letter (text), printing an image, printing, and the like.

Subsequently, the tetra black of the present teaching is characterized by being recorded on a recording medium by use of the water-based yellow ink, the water-based magenta ink, the water-based cyan ink, and the water-based black ink configuring the water-based ink set for ink-jet recording of the present teaching. The tetra black of the present teaching is excellent in the optical density (OD value) and fixation property on the recording medium.

EXAMPLES

Next, examples related to the present teaching will be explained together with comparative examples. Note that the present teaching is not limited by and is not restricted to the examples and the comparative examples which will be described below.

[Preparation of Color Pigment Dispersion Liquid]

Purified water was added to 20% by weight of each pigment indicated in Tables 1 to 3 and 5.0% by weight of a resin dispersant (acrylic acid-acrylic acid ester copolymer), so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). Accordingly, each of the pigment dispersion liquids 1, 3 to 5, and 7 indicated in Tables 1 to 3 was obtained.

Further, each of the pigment dispersion liquids 2, 6 and 8 indicated in Tables 1 to 3 was obtained by using each pigment indicated in Tables 1 to 3 through the method disclosed in Published Japanese Translation of PCT International Publication for Patent Application No. 2009-515007 corresponding to United States Patent Application Publication Nos. US 2007/0100023, US 2007/0100024 and US 2016/0075880. The pigment in each of the pigment dispersions 2, 6, and 8 was a self-dispersible pigment, and each of the pigment dispersion liquids 2, 6 and 8 contains no resin dispersant.

[Preparation of Black Pigment Dispersion Liquid]

40 g of Carbon black "#2650" produced by MITSUBISH CHEMICAL CORPORATION was mixed with 200 g of ion-exchanged water, followed by being pulverized by a bead mill. The pulverized mixture was added with a carboxyl group agent, followed by being heated and agitated, and subjected to oxidation processing. The obtained liquid was cleaned with a solvent for a several times, was poured into water, and was cleaned again with water in a repeated manner. Then, the liquid was filtrated with a filter, and thus each of the pigment dispersion liquids 9 to 11 indicated in Table 4 was prepared. The average particle size of the carbon black in each of the pigment dispersion liquids 9 to 11 was measured by using a "LB-550" manufactured by HORIBA, Ltd., and the average particle sizes of the pigment dispersion liquids 9 to 11 were 155 nm, 135 nm, and 115 nm, respectively. The pigment in the pigment dispersion liquids 9 to 11 was the self-dispersible carbon black modified by the carboxy group.

[Preparation of Water-Based Yellow Ink]

Components, except for each pigment dispersion liquid, which were included in Water-based Ink Composition (TABLE 1) as indicated below were mixed uniformly or homogeneously; and thus an ink solvent was obtained. Subsequently, the ink solvent was added to the pigment dispersion liquid, followed by being mixed uniformly. After that, the obtained mixture was filtrated through a cellulose acetate membrane filter (pore size 3.00 μm) produced by Toyo Roshi Kaisha, Ltd., and thus each of water-based yellow inks Y1 to Y6 and Y1c as indicated in TABLE 1 was obtained.

TABLE 1

|  |  | Y1 | Y2 | Y3 | Y4 |
|---|---|---|---|---|---|
| Water-based Ink Composition | Pigment dispersion liquid 1 (*1) | 4.50 | 5.00 | 4.00 | 3.00 |
| | Pigment dispersion liquid 2 (*2) | — | — | — | — |
| | Glycerol | 18.00 | 18.00 | 18.00 | 18.00 |
| | Triethylene glycol-n-butyl ether | 4.00 | 4.00 | 4.00 | 4.00 |
| | OLFIN (trade name) E1010 (*3) | 0.20 | 0.20 | 0.20 | 0.20 |
| | SUNNOL (trade name) NL-1430 (*4) | 0.30 | 0.30 | 0.30 | 0.30 |
| | Water | balance | balance | balance | balance |

|  |  | Y5 | Y6 | Y1c |
|---|---|---|---|---|
| Water-based Ink Composition | Pigment dispersion liquid 1 (*1) | 1.50 | 7.00 | — |
| | Pigment dispersion liquid 2 (*2) | — | — | 4.50 |
| | Glycerol | 18.00 | 18.00 | 18.00 |
| | Triethylene glycol-n-butyl ether | 4.00 | 4.00 | 4.00 |
| | OLFIN (trade name) E1010 (*3) | 0.20 | 0.20 | 0.20 |
| | SUNNOL (trade name) NL-1430 (*4) | 0.30 | 0.30 | 0.30 |
| | Water | balance | balance | balance |

TABLE 1 - LEGEND (*1): Dispersion liquid (containing resin dispersant) of C.I. Pigment Yellow 74 (average particle size: 125 nm)

(*2): Prepared by using C.I. Pigment Yellow 74 (average particle size: 125 nm) as pigment by a method described, for example, in Published Japanese Translation of PCT International Publication for Patent Application No. 2009-515007 corresponding to United States Patent Application Publication Nos. US 2007/0100023, US 2007/0100024 and US 2016/0075880

(*3): Acetylenic glycol-based surfactant; produced by Nisshin Chemical Co., Ltd.

(*4): Surfactant; produced by LION SPECIALTY CHEMICALS CO., LLD.

Regarding numerals in the table, those of the pigment dispersion liquids each indicate the solid content amount, and those of the surfactants each indicate the active ingredient amount, and the unit of the water-based ink composition is "% by weight".

[Preparation of Water-Based Magenta Ink]

Components, except for each pigment dispersion liquid, which were included in Water-based Ink Composition (TABLE 2) as indicated below were mixed uniformly or homogeneously; and thus an ink solvent was obtained. Subsequently, the ink solvent was added to the pigment dispersion liquid, followed by being mixed uniformly. After that, the obtained mixture was filtrated through a cellulose acetate membrane filter (pore size 3.00 μm) produced by Toyo Roshi Kaisha, Ltd., and thus each of water-based magenta inks M1 to M11, M1c, and M2c as indicated in TABLE 2 was obtained. In TABLE 2, a dye (1-1) indicates the compound represented by the formula (1-1).

TABLE 2

| | | M1 | M2 | M3 | M4 | M5 | M6 |
|---|---|---|---|---|---|---|---|
| Water-based Ink Composition (% by weight) | Pigment dispersion liquid 3 (*5) | 4.50 | 4.50 | — | 6.00 | 6.00 | 3.00 |
| | Pigment dispersion liquid 4 (*6) | — | — | 4.50 | — | — | — |
| | Pigment dispersion liquid 5 (*7) | — | — | — | — | — | — |
| | Pigment dispersion liquid 6 (*8) | — | — | — | — | — | — |
| | Dye (1-1) | 1.00 | — | — | — | — | — |
| | C.I. Acid Red 289 | — | 1.00 | 1.00 | 0.50 | — | 2.00 |
| | C.I. Acid Red 1 | — | — | — | — | 0.35 | — |
| | C.I. Acid Red 52 | — | — | — | — | — | — |
| | Glycerol | 15.00 | 15.00 | 15.00 | 15.00 | 15.00 | 15.00 |
| | Triethylene glycol-n-butyl ether | 4.00 | 4.00 | 4.00 | 4.00 | 4.00 | 4.00 |
| | OLFIN (trade name) E1010 (*3) | 0.20 | 0.20 | 0.20 | 0.20 | 0.20 | 0.20 |
| | SUNNOL (trade name) NL-1430 (*4) | 0.30 | 0.30 | 0.30 | 0.30 | 0.30 | 0.30 |
| | Water | balance | balance | balance | balance | balance | balance |

| | | M7 | M8 | M9 | M10 | M11 |
|---|---|---|---|---|---|---|
| Water-based Ink Composition (% by weight) | Pigment dispersion liquid 3 (*5) | 3.00 | 4.50 | — | 1.00 | 7.00 |
| | Pigment dispersion liquid 4 (*6) | — | — | — | — | — |
| | Pigment dispersion liquid 5 (*7) | — | — | 4.50 | — | — |
| | Pigment dispersion liquid 6 (*8) | — | — | — | — | — |
| | Dye (1-1) | 2.50 | — | 1.00 | 1.00 | 1.00 |
| | C.I. Acid Red 289 | — | — | — | — | — |
| | C.I. Acid Red 1 | — | — | — | — | — |
| | C.I. Acid Red 52 | — | 1.00 | — | — | — |
| | Glycerol | 15.00 | 15.00 | 15.00 | 15.00 | 15.00 |
| | Triethylene glycol-n-butyl ether | 4.00 | 4.00 | 4.00 | 4.00 | 4.00 |
| | OLFIN (trade name) E1010 (*3) | 0.20 | 0.20 | 0.20 | 0.20 | 0.20 |
| | SUNNOL (trade name) NL-1430 (*4) | 0.30 | 0.30 | 0.30 | 0.30 | 0.30 |
| | Water | balance | balance | balance | balance | balance |

| | | M1c | M2c |
|---|---|---|---|
| Water-based Ink Composition (% by weight) | Pigment dispersion liquid 3 (*5) | 4.50 | — |
| | Pigment dispersion liquid 4 (*6) | — | — |
| | Pigment dispersion liquid 5 (*7) | — | — |
| | Pigment dispersion liquid 6 (*8) | — | 4.50 |
| | Dye (1-1) | — | 1.00 |
| | C.I. Acid Red 289 | — | — |
| | C.I. Acid Red 1 | — | — |
| | C.I. Acid Red 52 | — | — |
| | Glycerol | 15.00 | 15.00 |
| | Triethylene glycol-n-butyl ether | 4.00 | 4.00 |
| | OLFIN (trade name) E1010 (*3) | 0.20 | 0.20 |
| | SUNNOL (trade name) NL-1430 (*4) | 0.30 | 0.30 |
| | Water | balance | balance |

TABLE 2 - LEGEND (*5): Dispersion liquid (containing resin dispersant) of C. I. Pigment Red 122 (average particle size: 130 nm)

(*6): Dispersion liquid (containing resin dispersant) of C. I. Pigment Red 122 (average particle size: 120 nm)

(*7): Dispersion liquid (containing resin dispersant) of C. I. Pigment Violet 19 (average particle size: 135 nm)

(*8): Prepared by using C. I. Pigment Red 122 (average particle size: 125 nm) as pigment by a method described, for example, in Published Japanese Translation of PCT International Publication for Patent Application No. 2009-515007 corresponding to United States Patent Application Publication Nos. US 2007/0100023, US 2007/0100024 and US 2016/0075880

(*3): Acetylenic glycol-based surfactant; produced by Nisshin Chemical Co., Ltd.

(*4): Surfactant; produced by LION SPECIALTY CHEMICALS CO., LLD.

Regarding numerals in the table, those of the pigment dispersion liquids each indicate the solid content amount, and those of the surfactants each indicate the active ingredient amount, and the unit of the water-based ink composition is "% by weight".

[Preparation of Water-Based Cyan Ink]

Components, except for each pigment dispersion liquid, which were included in Water-based Ink Composition (TABLE 3) as indicated below were mixed uniformly or homogeneously; and thus an ink solvent was obtained. Subsequently, the ink solvent was added to the pigment dispersion liquid, followed by being mixed uniformly. After that, the obtained mixture was filtrated through a cellulose acetate membrane filter (pore size 3.00 μm) produced by Toyo Roshi Kaisha, Ltd., and thus each of water-based cyan inks C1 to C6, and C1c as indicated in TABLE 3 was obtained.

TABLE 3

|  |  | C1 | C2 | C3 | C4 | C5 |
|---|---|---|---|---|---|---|
| Water-based Ink Composition | Pigment dispersion liquid 7 (*9) | 3.50 | 4.50 | 3.00 | 5.00 | 1.50 |
|  | Pigment dispersion liquid 8 (*10) | — | — | — | — | — |
|  | Glycerol | 12.00 | 12.00 | 12.00 | 12.00 | 12.00 |
|  | Triethylene glycol-n-butyl ether | 4.00 | 4.00 | 4.00 | 4.00 | 4.00 |
|  | OLFIN (trade name) E1010 (*3) | 0.20 | 0.20 | 0.20 | 0.20 | 0.20 |
|  | SUNNOL (trade name) NL-1430 (*4) | 0.20 | 0.20 | 0.20 | 0.20 | 0.20 |
|  | Water | balance | balance | balance | balance | balance |

|  |  | C6 | C1c |
|---|---|---|---|
| Water-based Ink Composition | Pigment dispersion liquid 7 (*9) | 7.00 | — |
|  | Pigment dispersion liquid 8 (*10) | — | 4.50 |
|  | Glycerol | 12.00 | 12.00 |
|  | Triethylene glycol-n-butyl ether | 4.00 | 4.00 |
|  | OLFIN (trade name) E1010 (*3) | 0.20 | 0.20 |
|  | SUNNOL (trade name) NL-1430 (*4) | 0.20 | 0.20 |
|  | Water | balance | balance |

TABLE 3 - LEGEND
(*9): Dispersion liquid (containing resin dispersant) of C. I. Pigment Blue 15:3 (average particle size: 110 nm)
(*10): Prepared by using C. I. Pigment Blue 15:3 (average particle size: 110 nm) as pigment by a method described, for example, in Published Japanese Translation of PCT International Publication for Patent Application No. 2009-515007 corresponding to United States Patent Application Publication Nos. US 2007/0100023, US 2007/0100024 and US 2016/0075880
(*3): Acetylenic glycol-based surfactant; produced by Nisshin Chemical Co., Ltd.
(*4): Surfactant; produced by LION SPECIALTY CHEMICALS CO., LLD.

Regarding numerals in the table, those of the pigment dispersion liquids each indicate the solid content amount, and those of the surfactants each indicate the active ingredient amount, and the unit of the water-based ink composition is "% by weight".

[Preparation of Water-Based Black Ink]

Components, except for each pigment dispersion liquid, which were included in Water-based Ink Composition (TABLE 4) as indicated below were mixed uniformly or homogeneously; and thus an ink solvent was obtained. Subsequently, the ink solvent was added to the pigment dispersion liquid, followed by being mixed uniformly. After that, the obtained mixture was filtrated through a cellulose acetate membrane filter (pore size 3.00 μm) produced by Toyo Roshi Kaisha, Ltd., and thus each of water-based black inks Bk1 to Bk5, and Bk1c as indicated in TABLE 4 was obtained.

TABLE 4

|  |  | Bk1 | Bk2 | Bk3 | Bk4 |
|---|---|---|---|---|---|
| Water-based Ink Composition | Pigment dispersion liquid 9 (*11) | 8.00 | — | 6.00 | 5.00 |
|  | Pigment dispersion liquid 10 (*12) | — | 10.00 | — | — |
|  | Pigment dispersion liquid 11 (*13) | — | — | — | — |
|  | Glycerol | 15.00 | 15.00 | 15.00 | 15.00 |
|  | Triethylene glycol-n-butyl ether | 4.00 | 4.00 | 4.00 | 4.00 |
|  | OLFIN (trade name) E1010 (*3) | 0.30 | 0.30 | 0.30 | 0.30 |
|  | SUNNOL (trade name) NL-1430 (*4) | 0.50 | 0.50 | 0.50 | 0.50 |
|  | Water | balance | balance | balance | balance |

TABLE 4-continued

|  |  | Bk5 | Bk1c |
|---|---|---|---|
| Water-based Ink Composition | Pigment dispersion liquid 9 (*11) | — | — |
|  | Pigment dispersion liquid 10 (*12) | 11.00 | — |
|  | Pigment dispersion liquid 11 (*13) | — | 8.00 |
|  | Glycerol | 15.00 | 15.00 |
|  | Triethylene glycol-n-butyl ether | 4.00 | 4.00 |
|  | OLFIN (trade name) E1010 (*3) | 0.30 | 0.30 |

TABLE 4-continued

| | | |
|---|---|---|
| SUNNOL (trade name) NL-1430 (*4) | 0.50 | 0.50 |
| Water | balance | balance |

TABLE 4 - LEGEND
(*11): Dispersion liquid of carbon black (average particle size: 155 nm)
(*12): Dispersion liquid of carbon black (average particle size: 135 nm)
(*13): Dispersion liquid of carbon black (average particle size: 115 nm)
(*3): Acetylenic glycol-based surfactant; produced by Nisshin Chemical Co., Ltd.
(*4): Surfactant; produced by LION SPECIALTY CHEMICALS CO., LLD.

Regarding numerals in the table, those of the pigment dispersion liquids each indicate the solid content amount, and those of the surfactants each indicate the active ingredient amount, and the unit of the water-based ink composition is "% by weight".

Examples 1 to 14 and Comparative Examples 1 to 3

<Configuration of Water-Based Ink Set for Ink-Jet Recording>

As indicated in TABLE 5, each of the water-based ink sets for ink-jet recording was configured by combining one of the water-based yellow inks, the water-based magenta inks, the water-based cyan inks, and the water-based black inks indicated in TABLE 1 to TABLE 4.

<Evaluation of Water-Based Ink Set for Ink-Jet Recording>

With respect to the water-based ink sets of examples and comparative examples, (a) optical density (OD value) evaluation of tetra black recorded on mat paper, (b) fixing property evaluation of tetra black recorded on glossy paper, and (c) contact coagulation (aggregation) evaluation were conducted by the following methods.

(a) Optical Density (OD Value) Evaluation of Tetra Black Recorded on Mat Paper

An ink-jet printer "MFC-J4510N" manufactured by BROTHER KOGYO KABUSHIKI KAISHA was used to record an image including tetra black on mat paper ("BP60MA" manufactured by BROTHER KOGYO KABUSHIKI KAISHA) by using the water-based inks configuring the water-based ink set of each of the examples and comparative examples. Thus, each evaluation sample was produced. The optical densities (OD values) of each of the evaluation samples at three locations (three portions) of each evaluation sample were measured by using a spectrophotometric colorimetry meter "SpectroEye" (light source: D50; field: 2°; ANSI T) manufactured by X-Rite Inc., and the average value of the optical densities (OD values) of each of the samples was obtained. Then, the optical density (OD value) of tetra black recorded on the mat paper was evaluated based on the following evaluation criterion.

<Evaluation Criterion for Optical Density (OD Value) Evaluation of Tetra Black Recorded on Mat Paper>

AA: Optical density (OD value) was not less than 1.55.

A: Optical density (OD value) was not less than 1.45 and less than 1.55.

C: Optical density (OD value) was less than 1.45.

(b) Fixing Property Evaluation of Tetra Black Recorded on Glossy Paper

The ink-jet printer "MFC-J4510N" was used to record an image including tetra black on glossy paper ("BP71G" manufactured by BROTHER KOGYO KABUSHIKI KAISHA) by using the water-based inks configuring the water-based ink set of each of the examples and comparative examples. Thus, each evaluation sample was produced. Then, each of the samples was used to evaluate the fixing property of tetra black recorded on the glossy paper based on the following evaluation criterion.

<Evaluation Criterion for Fixing Property Evaluation of Tetra Black Recorded on Glossy Paper>

AA: When the evaluation sample was rubbed after the elapse of three minutes from recording, no dirt was caused on and around the rubbed part.

A: When the evaluation sample was rubbed after the elapse of three minutes from recording, dirt was caused on and around the rubbed part. When the evaluation sample was rubbed after the elapse of 10 minutes from recording, no dirt was caused on and around the rubbed part.

C: When the evaluation sample was rubbed after the elapse of one hour from recording, dirt was caused on and around the rubbed part.

(c) Contact Coagulation (Aggregation) Evaluation

Figure 2A:
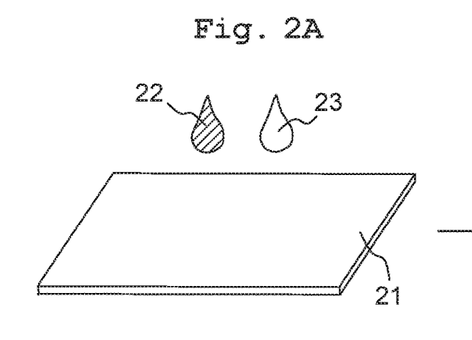
FIGS. 2A and 2B illustrate a method of contact coagulation (aggregation) evaluation according to examples of the present teaching.
Figure 2B:
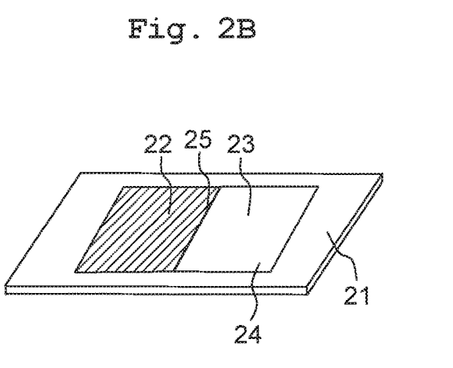

As depicted in FIG. 2A, a water-based black ink 22 and a water-based cyan ink 23 configuring a water-based ink set of examples and comparative examples were dripped in an amount of 3 μL onto a glass slide 21. Subsequently, as depicted in FIG. 2B, the dropped inks 22 and 23 were covered with a cover glass 24 so that they were brought into contact with each other. A prepared slide obtained described above and having the interface 25 between the inks 22 and 23 was observed with an optical microscope of 200 magnifications, and the evaluation was performed in accordance with the following evaluation criteria. The evaluation was performed similarly on a combination of the water-based black ink and the water-based magenta ink and a combination of the water-based black ink and the water-based yellow ink. Namely, in each of the ink-sets, the contact coagulation evaluation for combinations of the water-based black ink and three water-based color inks (Y, M, C), that is, the contact coagulation evaluation for three combinations in total were performed. Of the three combinations, the worst evaluation result was adopted as the result of contact coagulation evaluation in each of the ink-sets. If the result of the contact coagulation evaluation was good, no coagulation (aggregation) was caused while the wiper member was wiping the nozzle-formed surface. Namely, it may be determined that the water-based ink set has good jetting stability.

<Evaluation Criterion for Contact Coagulation Evaluation>

Figure 3A:
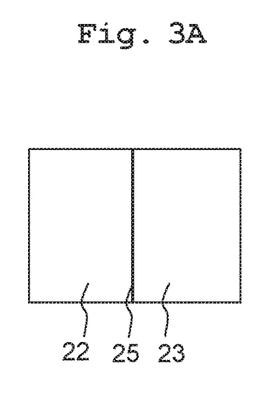
FIGS. 3A to 3C illustrate evaluation criteria of the contact coagulation evaluation according to the examples of the present teaching.

AA: As depicted in FIG. 3A, no coagulation (aggregation) was observed in the interface 25 between the inks.

Figure 3B:
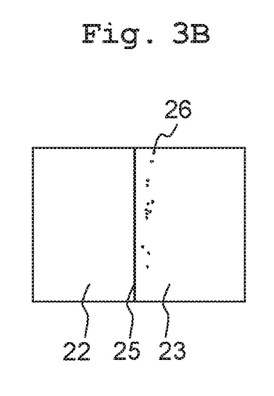

A: As depicted in FIG. 3B, small solid matters 26 caused by coagulation (aggregation) were observed in the interface 25 between the inks.

Figure 3C:
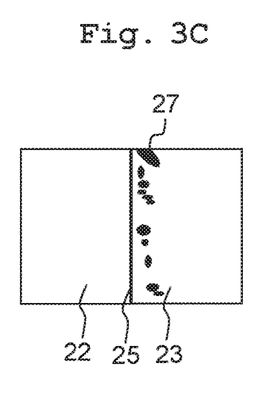

C: As depicted in FIG. 3C, large solid matters 27 caused by coagulation (aggregation) were observed in the interface 25 between the inks.

TABLE 5 indicates the configurations and evaluation results of the water-based ink sets of Examples 1 to 14 and Comparative Examples 1 to 3.

TABLE 5

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Water-based yellow ink | Y1 | Y2 | Y1 | Y3 | Y3 | Y4 | Y4 | Y1 | Y1 | Y5 |
| Water-based magenta ink | M1 | M2 | M3 | M4 | M5 | M6 | M7 | M8 | M9 | M10 |
| Water-based cyan ink | C1 | C2 | C1 | C3 | C3 | C4 | C4 | C1 | C1 | C5 |
| Water-based black ink | Bk1 | Bk2 | Bk1 | Bk2 | Bk2 | Bk3 | Bk3 | Bk1 | Bk1 | Bk1 |
| Optical density (OD value) of tetra black recorded on mat paper | AA | AA | A | AA | A | AA | AA | A | AA | A |
| Fixing property of tetra black recorded on glossy paper | AA | AA | AA | AA | AA | AA | AA | AA | A | AA |
| Contact coagulation (aggregation) | AA | AA | AA | AA | AA | AA | A | AA | AA | AA |

|  | Examples | | | | Comparative Examples | | |
| --- | --- | --- | --- | --- | --- | --- | --- |
|  | 11 | 12 | 13 | 14 | 1 | 2 | 3 |
| Water-based yellow ink | Y1 | Y6 | Y3 | Y1 | Y1 | Y3 | Y1c |
| Water-based magenta ink | M1 | M11 | M4 | M1 | M1 | M1c | M2c |
| Water-based cyan ink | C1 | C6 | C3 | C1 | C1 | C4 | C1c |
| Water-based black ink | Bk4 | Bk1 | Bk4 | Bk5 | Bk1c | Bk1 | Bk1 |
| Optical density (OD value) of tetra black recorded on mat paper | A | AA | A | AA | C | C | AA |
| Fixing property of tetra black recorded on glossy paper | AA | A | AA | A | AA | AA | C |
| Contact coagulation (aggregation) | AA | AA | A | AA | AA | AA | C |

As indicated in TABLE 5, Examples 1 to 14 had good evaluation results of the optical density (OD value) of tetra black recorded on mat paper, the fixation property of tetra black recorded on glossy paper, and the contact coagulation (aggregation). Examples 1 to 14 also had good evaluation results of the optical density (OD value) and fixation property of tetra black recorded on a recording medium other than the mat paper and glossy paper.

Especially, Example 1, in which the water-based color ink (magenta ink) containing the color pigment, of which average particle size was greatest, contained the dye, had the evaluation result of the optical density (OD value) of tetra black recorded on mat paper much better than Example 3 having the same conditions except that, instead of the water-based color ink (yellow ink) containing the color pigment of which average particle size was greatest, the water-based magenta ink contained the dye. Thus, it is assumed that, by allowing the water-based color ink containing the color pigment of which average particle size was largest and which was most likely to have a white streak, to contain the dye, the white streak was prevented and the optical density (OD value) of tetra black on the recording medium was improved in Example 1.

Example 4, in which the blending amount of the dye was 0.50% by weight, had the evaluation result of the optical density (OD value) of tetra black recorded on mat paper much better than Example 5 having the same conditions except that the blending amount of the dye was 0.35% by weight. Example 6, in which the blending amount (D) of the dye was 2.00% by weight and D:P=1:3 was satisfied, had the evaluation result of contact coagulation much better than Example 7 having the same conditions except that the blending amount (D) of the dye was 2.50% by weight and D:P=1:2.4 was satisfied. Thus, it is assumed that, by making the blending amount (D) of the dye in the entire amount of the water-based color ink in a range of 0.5% by weight to 2% by weight, the color expression property of the water-based color ink increased, the optical density (OD value) of tetra black on the recording medium improved, and contact coagulation was prevented in Examples 4 and 6. Regarding Example 5, it is assumed that, since the blending amount (D) of the dye was below the above range, the optical density (OD value) of tetra black of Example 5 was inferior to those of Examples 4 and 6. Regarding Example 7, the blending amount (D) of the dye exceeded the above range and the blending amount (D) of the dye to the blending amount (P) of the self-dispersible carbon black was large. Example 7 did not satisfy the weight ratio (D:P)=1:3 to 50. Thus, it is assumed that Example 7 was more likely to cause contact coagulation than Examples 4 and 6.

Example 1, in which the dye represented by the formula (1) was used as the dye, had the evaluation result of the optical density (OD value) of tetra black recorded on mat paper much better than Example 8 having the same conditions except that C.I. Acid Red 52 was used as the dye. It is assumed that, in Example 1, by allowing the water-based magenta ink to contain the dye represented by the formula (1) having a hue angle of 340° to 360°, the color expression property of the water-based magenta ink increased singly or independently, which in turns improved the optical density (OD value) of tetra black on the recording medium. It is assumed that, in Example 8, by using C.I. Acid Red 52 having a hue angle outside the range of 340° to 360°, the optical density (OD value) of tetra black of Example 8 was inferior to that of Example 1.

Example 1, in which C.I. Pigment Red 122 was used as the magenta pigment, had the evaluation result of the fixation property of tetra black recorded on glossy paper much better than Example 9 having the same conditions except that C.I. Pigment Violet 19 was used as the magenta pigment.

Example 1, in which the blending amount of the self-dispersible carbon black was 8.00% by weight, had the evaluation result of the optical density (OD value) of tetra black recorded on mat paper much better than Example 11 having the same conditions except that the blending amount of the self-dispersible carbon black was 5.00% by weight. Example 6, in which the blending amount of the self-dispersible carbon black was 6.00% by weight and D:P=1:3 was satisfied, had the evaluation results of the optical density (OD value) of tetra black recorded on mat paper and contact coagulation much better than Example 13 having the same conditions except that the blending amount of the self-dispersible carbon black was 5.00% by weight and D:P=1:2.5 was satisfied. Example 1, in which the blending amount of the self-dispersible carbon black was 8.00% by weight, had the evaluation result of the fixing property of tetra black recorded on glossy paper much better than Example 14 having the same conditions except that the blending amount of the self-dispersible carbon black was 11.00% by weight. Thus, it is assumed that, in Examples 1 and 6, by making the blending amount of the self-dispersible carbon black in the entire amount of the water-based black ink in a range of 6% by weight to 10% by weight, the optical density (OD value) and the fixing property of tetra black on the recording medium improved and contact coagulation was prevented. It is assumed that, in Example 11, since the blending amount of the self-dispersible carbon black was below the above range, the optical density (OD value) of tetra black of Example 11 was inferior to those of Examples 1 and 6. It is assumed that, in Example 14, since the blending amount of the self-dispersible carbon black exceeded the above range, the fixing property of Example 14 was inferior to those of Examples 1 and 6. It is assumed that, in Example 13, since the blending amount of the self-dispersible carbon black was below the above range, the optical density (OD value) of tetra black was inferior to those of Examples 1 and 6. Further, in Example 13, the blending amount (D) of the dye to the blending amount (P) of the self-dispersible carbon black was large, and the weight ratio (D:P)·1:3 to 50 was not satisfied. Thus, it is assumed that Example 13 caused contact coagulation more easily than Examples 1 and 6.

Comparative Example 1, in which the average particle size of the self-dispersible carbon black of the water-based black ink was less than 120 nm, had a bad evaluation result of the optical density (OD value) of tetra black recorded on mat paper. Comparative Example 2, in which no water-based color inks contain the dye, had a bad evaluation result of the optical density (OD value) of tetra black recorded on mat paper. Comparative Example 3, in which the self-dispersible pigment inks containing no resin dispersant were used as the water-based color inks, had bad evaluation results of the fixation property of tetra black recorded on glossy paper and contact coagulation. The reason why Comparative Example 3 had a bad evaluation result of contact coagulation is assumed as follows. The water-based color inks containing the self-dispersible pigments contain more plus ions (positive ions) than the water-based color ink containing the resin dispersant (so-called resin dispersion ink). Thus, it is assumed that, in Comparative Example 3, dispersion of the negatively charged self-dispersible carbon black was destabilized by plus ions in the water-based color inks, causing coagulation.

As described above, the water-based ink set of the present teaching is excellent in the optical density (OD value) and fixation property of tetra block on a recording medium. The usage of the water-based ink set of the present teaching is not particularly limited, and is widely applicable to a variety of kinds of ink-jet recording.

What is claimed is:

1. A water-based ink set for ink-jet recording, wherein the water-based ink set comprises:
    a water-based yellow ink containing a yellow pigment, a resin dispersant, and water;
    a water-based magenta ink containing a magenta pigment, a resin dispersant, and water;
    a water-based cyan ink containing a cyan pigment, a resin dispersant, and water;
    a water-based black ink containing self-dispersible carbon black and water,
    wherein the self-dispersible carbon black has an average particle size of 120 to 170 nm, and
    the water-based color ink selected from the group consisting of the water-based yellow ink, the water-based magenta ink, and the water-based cyan ink which contains a color pigment of which average particle size is largest among the yellow pigment, the magenta pigment, and the cyan pigment, further contains a dye, and the remaining two water-based color inks contain no dye.

2. The water-based ink set for ink-jet recording according to claim 1, wherein the water-based color ink which contains a dye contains the dye in a blending amount (D) of 0.5% by weight to 2% by weight based on an entire amount of the respective water-based color ink, and
    a weight ratio (P/D) of a blending amount (P) of the self-dispersible carbon black in an entire amount of the water-based black ink to the blending amount (D) of the dye in the water-based color ink is 3 to 50.

3. The water-based ink set for ink-jet recording according to claim 1, wherein the average particle size of the self-dispersible carbon black is larger than the average particle sizes of each of the yellow pigment, the magenta pigment, and the cyan pigment.

4. The water-based ink set for ink-jet recording according to claim 1, wherein the water-based magenta ink contains the dye, and the water-based yellow ink and the water-based cyan ink contain no dye.

5. The water-based ink set for ink-jet recording according to claim 4, wherein the dye in the water-based magenta ink has a hue angle of 340° to 360°.

6. The water-based ink set for ink-jet recording according to claim 4, wherein the dye in the water-based magenta ink is at least one dye selected from the group consisting of a dye represented by the following formula (1), C.I. Acid Red 1, and C.I. Acid Red 289:

(1)

in the formula (1),
    n is 0, 1, or 2
    each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ are identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ are identical to or different from each other;

when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms are identical to or different from each other.

7. The water-based ink set for ink-jet recording according to claim 6, wherein the dye in the water-based magenta ink is a dye represented by the formula (1).

8. The water-based ink set for ink-jet recording according to claim 1, wherein the self-dispersible carbon black has the largest average particle size, the magenta pigment has a second largest average particle size, the yellow pigment has a third largest average particle size, and the cyan pigment has a smallest average particle size.

9. The water-based ink set for ink-jet recording according to claim 1, wherein the yellow pigment is C.I. Pigment Yellow 74, the magenta pigment is C.I. Pigment Red 122, and the cyan pigment is C.I. Pigment Blue 15:3.

10. The water-based ink set for ink-jet recording according to claim 1, wherein the self-dispersible carbon black is a self-dispersible carbon black modified by a carboxy group.

11. The water-based ink set for ink-jet recording according to claim 1, wherein the self-dispersible carbon black has an average particle size of 135 to 170 nm.

12. The water-based ink set for ink-jet recording according to claim 1, wherein the water-based black ink contains 6% by weight to 10% by weight of the self-dispersible carbon black.

13. The water-based ink set for ink-jet recording according to claim 1, wherein the water-based yellow ink, the water-based magenta ink, the water-based cyan ink, and the water-based black ink further contain triethylene glycol-n-butyl ether.

14. The water-based ink set for ink-jet recording according to claim 1, wherein the water-based yellow ink, the water-based magenta ink, the water-based cyan ink, and the water-based black ink further contain an acetylenic glycol-based surfactant.

* * * * *